(12) United States Patent
Twining et al.

(10) Patent No.: US 10,701,913 B2
(45) Date of Patent: Jul. 7, 2020

(54) METHODS AND APPARATUS FOR UNMANNED AIRCRAFT-BASED OBJECT DETECTION

(71) Applicant: PLANCK AEROSYSTEMS, INC., San Diego, CA (US)

(72) Inventors: David Twining, San Diego, CA (US); Joshua Wells, San Diego, CA (US)

(73) Assignee: PLANCK AEROSYSTEMS INC., San Diego, CA (US)

( * ) Notice: Subject to any disclaimer, the term of this patent is extended or adjusted under 35 U.S.C. 154(b) by 0 days.

(21) Appl. No.: 16/069,861

(22) PCT Filed: Jan. 12, 2017

(86) PCT No.: PCT/US2017/013203
§ 371 (c)(1),
(2) Date: Jul. 12, 2018

(87) PCT Pub. No.: WO2017/123768
PCT Pub. Date: Jul. 20, 2017

(65) Prior Publication Data
US 2019/0014760 A1 Jan. 17, 2019

Related U.S. Application Data

(60) Provisional application No. 62/277,907, filed on Jan. 12, 2016.

(51) Int. Cl.
*A01K 79/00* (2006.01)
*B64C 39/02* (2006.01)
(Continued)

(52) U.S. Cl.
CPC ........... *A01K 79/00* (2013.01); *A01M 31/002* (2013.01); *B64C 27/46* (2013.01); *B64C 39/024* (2013.01);
(Continued)

(58) Field of Classification Search
CPC ........ B64C 2201/024; B64C 2201/027; B64C 2201/108; B64C 2201/12;
(Continued)

(56) References Cited

U.S. PATENT DOCUMENTS 5,457,639 A * 10/1995 Ulich .................... G01S 17/18
356/5.1
8,148,992 B2 * 4/2012 Kowalczyk ............ G01V 3/104
324/365
(Continued)

FOREIGN PATENT DOCUMENTS

EP 3274256 A2 1/2018
WO WO-2006132713 A2 12/2006
(Continued)

OTHER PUBLICATIONS

PCT/US2018/038330 International Search Report and Written Opinion dated Sep. 18, 2018.
(Continued)

*Primary Examiner* — Atul Trivedi
(74) *Attorney, Agent, or Firm* — Wilson Sonsini Goodrich & Rosati

(57) ABSTRACT

The present disclosure describes a system and method for the use of unmanned aircraft systems to detect, locate, and identify objects in, on, or near the water that may provide useful information to people in a different location, such as on a nearby vessel for purposes of ultimately locating fish. The vessel can then take action based on data collected by the unmanned aircraft system, such as move to a new location to catch fish as detected by the unmanned aircraft system.

21 Claims, 9 Drawing Sheets

(51) Int. Cl.
*A01M 31/00* (2006.01)
*B64C 27/46* (2006.01)
*H04N 7/18* (2006.01)

(52) U.S. Cl.
CPC .. *B64C 2201/024* (2013.01); *B64C 2201/027* (2013.01); *B64C 2201/108* (2013.01); *B64C 2201/12* (2013.01); *B64C 2201/127* (2013.01); *B64C 2201/145* (2013.01); *B64C 2201/205* (2013.01); *H04N 7/185* (2013.01)

(58) Field of Classification Search
CPC ........ B64C 2201/127; B64C 2201/145; B64C 2201/205; B64C 27/46; B64C 39/024; A01M 31/002; A01K 79/00; H04N 7/185
USPC .............................................................. 701/3
See application file for complete search history.

(56) References Cited

U.S. PATENT DOCUMENTS

| | | |
|---|---|---|
| 2006/0058928 A1 | 3/2006 | Beard et al. |
| 2008/0207067 A1* | 8/2008 | Ricciuti ................ B63C 9/0005 441/11 |
| 2008/0260467 A1* | 10/2008 | Kroecker ................ B63B 35/44 405/195.1 |
| 2013/0120166 A1* | 5/2013 | Kommuri ............ G08G 5/0013 340/971 |
| 2014/0152792 A1* | 6/2014 | Krueger ................ A61M 21/00 348/78 |
| 2014/0222246 A1 | 8/2014 | Mohamadi |
| 2014/0236390 A1 | 8/2014 | Mohamadi |
| 2014/0324253 A1 | 10/2014 | Duggan et al. |
| 2014/0379173 A1* | 12/2014 | Knapp ................ G06Q 30/018 701/2 |
| 2015/0183498 A1 | 7/2015 | Wardle |
| 2015/0207964 A1 | 7/2015 | Bye et al. |
| 2015/0253126 A1* | 9/2015 | Palandro ................ G01B 11/06 348/135 |
| 2015/0262492 A1* | 9/2015 | Barnes ................... B64D 47/08 701/301 |
| 2015/0277442 A1* | 10/2015 | Ballou ................... B63H 25/04 701/21 |
| 2015/0298654 A1* | 10/2015 | Joao ........................ G01S 19/16 701/2 |
| 2015/0304813 A1* | 10/2015 | Esposito ................ H04B 7/155 455/456.2 |
| 2015/0370250 A1 | 12/2015 | Bachrach et al. |
| 2016/0144734 A1 | 5/2016 | Wang et al. |
| 2016/0306824 A1* | 10/2016 | Lopez ................... G06T 3/4092 |
| 2016/0340006 A1* | 11/2016 | Tang ......................... B63C 9/01 |
| 2016/0364989 A1* | 12/2016 | Speasl ................... B64C 39/024 |
| 2016/0376000 A1* | 12/2016 | Kohstall ................ B64C 37/00 114/313 |
| 2017/0069214 A1* | 3/2017 | Dupray ................. G08G 5/0021 |
| 2017/0129603 A1 | 5/2017 | Raptopoulos et al. |
| 2018/0173245 A1 | 6/2018 | Twining et al. |
| 2018/0186433 A1* | 7/2018 | Gharabegian ............ G08B 5/36 |
| 2018/0217256 A1* | 8/2018 | Stokes ..................... G01K 13/00 |
| 2018/0321680 A1* | 11/2018 | Tu ........................... G08C 17/02 |
| 2019/0128711 A1* | 5/2019 | Connor ................... H04W 4/40 |
| 2019/0202530 A1* | 7/2019 | Rikoski ................... B63B 22/02 |
| 2019/0266712 A1* | 8/2019 | Chirayath ................ G06T 5/50 |
| 2020/0011995 A1* | 1/2020 | Send ..................... G01S 7/4817 |

FOREIGN PATENT DOCUMENTS

| | | |
|---|---|---|
| WO | WO-2015154148 A1 | 10/2015 |
| WO | WO-2015179797 A1 | 11/2015 |
| WO | WO-2016204843 A2 | 12/2016 |
| WO | WO-2017123768 A1 | 7/2017 |

OTHER PUBLICATIONS

Co-pending U.S. Appl. No. 16/012,498, filed Jun. 19, 2018.
PCT/US2016/024347 International Preliminary Report on Patentability dated Oct. 12, 2017.
PCT/US2016/024347 International Search Report and Written Opinion dated Jan. 10, 2017.
PCT/US2017/013203 International Preliminary Report on Patentability dated Jul. 17, 2018.
PCT/US2017/013203 International Search Report and Written Opinion dated Apr. 25, 2017.

* cited by examiner

METHODS AND APPARATUS FOR UNMANNED AIRCRAFT-BASED OBJECT DETECTION

CROSS-REFERENCES TO RELATED APPLICATIONS

The present application is a non-provisional application claiming the benefit of priority from commonly owned and U.S. Provisional Application Ser. No. 62/277,907 filed on Jan. 12, 2016 and entitled "METHODS and APPARATUS FOR UNMANNED AIRCRAFT-BASED OBJECT DETECTION," the entire contents of which are hereby incorporated by reference into this disclosure as if set forth fully herein.

FIELD

The present invention relates generally to unmanned aerial vehicles, and more specifically to the use of unmanned aerial vehicles in the location of fish and other objects in the marine environment.

BACKGROUND

The global population has increased steadily over the last several centuries—since the times of the industrial revolution. Advances in both agriculture and medicine have enabled both improved fertility and decreased mortality, allowing for rapid population growth around the globe. Technological advances in food production have enabled the growth in population capacity of the world in one key way: by improving the efficiency with which food crops can be grown and harvested—not by expanding the overall size of the land devoted to agriculture. Increasingly, world populations are migrating out of rural, inland areas with easy access to agricultural food sources, into densely populated, urban, coastal areas. Today, more than 40% of the world's population lives within 100 km of a coast, and over half of the world's population lives in a city. Improvements in agricultural output are important to sustaining this population growth, but as people are increasingly detached from agricultural food sources, additional food sources must be sought and exploited.

The primary source of protein for a large percentage of the world's population comes not from onshore agriculture, but from fisheries. Particularly, the increasing urban, coastal communities of the developing world depend heavily on fish as a primary food staple. Wild-caught fish provide, according to some estimates, 20% of the world's protein intake—which will only increase as global populations continue to migrate towards the coasts. In contrast to the innovations seen in agriculture, the efficiency of catching wild-caught seafood has not improved significantly in generations, due in large part to relying on outdated, low-tech methods for location of the fish themselves. The bulk of innovation in the fishing industry has been in improving the effectiveness of catching or processing the fish—both of which have provided incremental improvement to yields. Ultimately, though, these improvements have not increased efficiency enough to offset the rising costs of the inputs to catching the fish (fuel, labor), and global prices have climbed steadily. Currently, fishing fleets use historical models to navigate to a position where fish are likely to congregate, but ultimately a good portion of the 'last mile' of catching fish is left to chance. This 'last mile' is where there is most opportunity for technological advancement.

The growing urban, coastal population of the world will need access to quality, low-cost seafood in the near and long-term. A means of improving the efficiency with which fish are located is needed to enable large increases in the output of the world's fisheries, thereby lowering the cost of seafood products, and fulfilling growing global demand. For this reason, operators of fishing vessels can use an unmanned aerial vehicle ("UAV," also called a "drone") to aid in the detection, identification, tracking, and ultimately catching of fish in an marine environment. The subject matter of the present disclosure is directed to overcoming, or at least reducing the effects of, the difficulty inherent in locating fish in the marine environment.

SUMMARY

The present disclosure accomplishes this goal by describing a system and method using unmanned aerial vehicles to detect, locate, identify and/or collect data about objects or features in, on, or near the water that indicate the potential presence of fish. This data can then be used by fishermen to make decisions about where, when, and how to fish. The use of an unmanned aircraft-based system can extend the visible range of fishing operators even further than previously possible, ultimately enabling detection of objects of interest at greater ranges than with previous methods. As noted previously, improving the efficiency by which objects of interest (e.g. fish and/or fish indicators) are located can lead to exponential overall efficiency gains for fishing operators. A primary driver of operating costs for fishing operators is the cost of fuel, and a significant portion of the fuel used in fishing operations is consumed while attempting to locate fish.

In general, the unmanned aircraft-based object detection system ("UA system") described herein includes a vessel, unmanned aircraft, unmanned aircraft payload ("UA payload"), and a communications station. The vessel may be any vessel that transports one or more users having a need or desire to know the locations of certain types of objects (e.g. fish and/or fish indicators) at sea, including but not limited to commercial and recreational fishing vessels, marine research vessels, and sightseeing vessels. The payload is comprised of a combination of sensors and communications components for gathering data, optionally analyzing the data, and communicating the data (raw or analyzed) to the user. The payload may be mounted as a module onto the aircraft or alternatively may be integrated into the aircraft. The payload communicates with the communications station to enable performance of the method described below. The communications station may be located onboard the user's vessel, onboard a different vessel, another UA system, or alternatively may be with a user on land. As will be appreciated, other related components can also be used and may be based on some of the same concepts detailed below.

In the example described herein throughout, the crew of the vessel is dedicated to locating fish or marine mammals, whether for catching and keeping as in fishing operations (recreational and/or commercial), or to simply observe and record data as in research or whale-watching operations. In any event, the vessel is positioned within a body of water in relatively close proximity to the target objects in order to detect them by any means. To date, the process of navigating to a particular point in the ocean with a high likelihood of finding fish has involved use of a vast array of methods and technologies. By way of illustration, these methods and technologies may include historical bathymetry charts, satellite imagery, or by locating indicia of fish activity, such as the presence of birds, kelp, or surface disturbances. The UA system described in the current disclosure serves as an enhancement to all of these existing technologies and methods.

In use, the UA system collects data using the unmanned aircraft, typically while the unmanned aircraft is flying above the water or the vessel. The collected data may be any data that is useful in determining the type and location of various seaborne objects, including but not limited to optical and/or infrared imagery of the water surface and/or objects above, on, or beneath the surface of the water.

The collected data is then used to detect objects or features of interest. Object detection may be user-driven or automated by the system. For user-driven object detection, the object or feature is detected by a user viewing the data collected by the system. For automated object detection, a computer detects the object or feature using the data collected by the system. The computer uses algorithms and software to detect such objects and features. By way of example, the computer performing this analysis may be located in the payload on the unmanned aircraft or alternatively may be located in the communications station on the vessel.

The UA system may then optionally determine the location of the object or feature of interest. This could include null results where no object or feature of interest was detected. The location can be the absolute location (for example, latitude and longitude) and/or location relative to the vessel or another object (for example, distance and direction). In the fishing example, the ability to determine the location of objects or features of interest is invaluable, especially if the object or features of interest are actually fish. The location of other objects or features of interest such as fish indicators (e.g. certain plant life, floating debris, geologic formations above and/or below the surface, etc.) are also important because they provide known or typical areas where fish congregate.

Another optional feature of the instant method is the identification of the object or feature of interest. The identification can be done by either a user of the data or by a computer. The identification can include any sort of categorization ranging from broad to specific. For example, in some instances an object may be broadly identified as "plant life." In other instances, it may be advantageous for the same object to be more narrowly identified as "kelp." It still other instances it may be desirable for the same object to be identified even more specifically as "*Macrocystis pyrifera*" (giant kelp). In yet another instance, the same object may be identified simply by its color or shape. In yet another instance, the same object may be identified as "non-water." Any number of categories may be used for identification of objects or features of interest.

In one embodiment, the computer identification may be accomplished via recognition of preprogrammed potential objects of interest. In another embodiment, the detection and identification of an object may be achieved by way of machine learning, alternatively referred to as artificial intelligence ("AI"), where the system can refine and enhance its object detection capabilities as it collects and processes more and more data, with or without user feedback. Such machine learning can apply to a specific trip, to specific environmental conditions (for example, lighting conditions or sea state), to a specific geographic area, or in other specific usage scenarios. Alternatively, the machine learning may apply to the object detection and identification in general. As the system learns, it can detect and identify objects more efficiently with higher probabilities of accurate detections and a reduction in the number of false detections. Furthermore, the machine learning process may improve the search process. For purposes of illustration only, a user may be shown many images which may or may not include images of marine mammals. The user then confirms which images contain marine mammals, and the system learns which features and attributes are the most likely to result in images that contain marine mammals. Over time, the system will become better at positively detecting and identifying marine mammals in images.

After the data is collected, the UA system disseminates the data to the user in either processed or unprocessed form. This could include the raw data, formatted data, compressed data, packaged data, or the data in any other form. This data can include the detection, location, identification of objects or features of objects of interest. The user may receive small pieces of data or large collections of data. The data may be categorized or uncategorized. Furthermore, it maybe be stored data.

The final step of the method is for the user to take action based on the received data. This could include directing the vessel (or a different vessel) to a new location, setting fish-catching devices, utilizing other technology, rerouting the umanned aircraft, notifying other vessels, saving the data, transmitting the data, or any other action based on the received data. Furthermore, the user's action may be to continue operations unchanged (i.e. decline to undertake new action in response to the received data).

In order to systematically search a particular area of seawater to collect data and detect objects or features of interest that are in, on, or above the water, the unmanned aircraft may be directed to fly in a certain flight pattern. The flight pattern allows the unmanned aircraft to alert the vessel of objects or features of interest in the water. The flight pattern may vary based on a number of factors, including current state of the vessel, current state of the unmanned aircraft, user inputs, previous data collected by the unmanned aircraft, current data collected by the unmanned aircraft, environmental conditions, previous data from other sources, current data from other sources, types of objects of features of interest, the type of vessel, or other factors. One example flight pattern includes a series of vectors that direct the unmanned aircraft to gather data from a series of generally triangular areas of seawater dispersed about the vessel. Other flight patterns are possible. For example, in some instances the unmanned aircraft will orbit the vessel at a predetermined distance, and will maintain that orbit as the vessel moves through the water. In other instances, the unmanned aircraft may circle the vessel in a gradually increasing radial manner. In still other instances, the unmanned aircraft may go directly to a location to inspect an object or feature of interest. In yet other instances, the unmanned aircraft may hover a fixed location, such as above the vessel. In still other instances, the unmanned aircraft may fly based on data it collects, such as orbiting a detected object of interest. Furthermore, it should be noted that the flight pattern may change multiple times during a flight as necessary.

When searching for objects or features of interest, any objects or features that inform the user (or UA system) about the potential to find fish or other sea life will be considered and analyzed. The most obvious object or feature of interest to a fisherman is one or more fish, which may include targeted fish, bait fish, or other fish. Other objects include marine mammals such as whales, seals, or sea lions. Floating objects, such as logs, trash, fish aggregating devices, flotsam, jetsam, buoys, debris, or markers can inform a user on a vessel. Other vessels, including boats, rafts, and ships, can be used to inform a user. Marine plant life, including but not limited to kelp, seaweed, plankton, and other plant life, is an important indicator the presence of fish or other sea life. One or more birds may be on or above the water and may be an object of interest. Water temperature is a valuable feature as well, as is water color or texture. The location of reefs, sandbars, islands or other land features may also be used.

In one embodiment, the aircraft may deploy a marker or buoy on or near an object of interest. This marker may be a floating object that is enabled with GPS so that it can determine its location and transmit that location to any number of suitable receivers, such as (but not necessarily limited to) the UA system that deployed the GPS-enabled floating object, another UA system, manned aircraft (e.g. patrol, commercial, military) and/or land-based stations. Alternatively, the marker may be a physical marker, such as a dye, that aids in localization by the user by optical means. A given unmanned aircraft may have multiple markers that could be deployed at multiple different locations. These markers could also serve to aid the user in locating detected objects in the event that the aircraft has a communication problem that prevents the anticipated transmission of data.

In one example embodiment, multiple UA systems (multiple unmanned aircrafts and/or multiple manned or unmanned vessels) may work together to collect and/or process data in order to detect, locate, and/or identify objects or features of interest. Any number of UA systems may communicate freely with each other, providing opportunities for multi-segment communication paths to collect, share, and disseminate data collected by the unmanned aircrafts. This includes communications directly between various unmanned aircrafts, between the unmanned aircrafts and (manned or unmanned) vessels, directly between the various vessels, between the vessels and/or the unmanned aircrafts and a station on shore, or to a remote user via a satellite communication link. Thus, multiple UA systems may be used to extend the transmission range (and therefore the search radius) such that data is passed from one aircraft or vessel to the next until it reaches its final destination, as in a communication relay. Furthermore, it may be used to deliver data to multiple locations. For example, data may be transmitted to multiple users in different locations (e.g. different vessels, shore station, or remote user) or a single user may send commands to multiple unmanned aircraft and/or multiple manned or unmanned vessels.

The UA system of the present disclosure includes a user interface that ensures that the user, regardless of their location, can interface with the UA system. The user interface can be used to display data, receive user inputs, provide guidance and navigation information, provide health and status information, tracking, and control of the unmanned aircraft. The user interface may perform data processing tasks. The user interface may provide alerts and notifications to the user—including, but not limited to, notification of detection of objects of interest. In the instant example, the user interface includes a primary window that for example may show (among other things) a live video feed from a camera in the payload on the unmanned aircraft. A smaller window may show the relative positioning of the vessel and unmanned aircraft on a digital map of the body of water, for example using GPS technology. The user may be prompted to provide real time feedback to the UA system as to whether the detected objects are in fact objects of interest, for example by selecting a "Yes" icon to give an affirmative response, a "No" icon to give a negative response, or a "Closer Look" icon to inform the UA system that more information is needed. If the user selects the "Yes" icon, then the user interface may display a map of the area displaying the exact location of the objects of interest. This location may be determined (by way of example) using the aircraft's GPS location and camera state. Thus, once an object of interest is found, the boat operator will be able to direct the vessel to the exact location provided by the UA system. The user interface is shown as being displayed on a tablet computer, however the user interface could additionally be provided on a desktop computer, laptop computer, and/or mobile device including smartphones.

In a preferred embodiment, the unmanned aircraft includes an onboard computer, which may be included in the payload or may be located elsewhere on the unmanned aircraft. The vessel includes a computer system referred to as the communications station. Additional computer systems (e.g. desktop computers, laptop computers, tablet computers, smartphones, and the like) may access the data from remote locations and are referred to as "remote computers". Data collected by the unmanned aircraft may be transmitted to the communications station for processing and/or handling. Data collected by the unmanned aircraft may be transmitted to the onboard computer for processing and/or handling. Data collected by the unmanned aircraft may be transmitted to a remote computer for processing and/or handling. One or more of these data paths may be used at any time and are not necessarily exclusive of one another. Data maybe be transmitted via electrical, optical, radio frequency, infrared, or acoustic means. Data processing may occur in multiple locations or at different times. Using the UA system to collect, process, and/or analyze data will allow fishermen to make better decisions about where, when, and how to fish. The UA system as described in the present disclosure will reduce uncertainty and enable more consistent catches.

The unmanned aircraft may include an aircraft controller, a lift system, a communication system, a sensor system and a data storage area. The controller may include a flight module, a communication module, a sensor module, a navigation module and a landing module.

According to one broad aspect of the disclosure, an example object detection system is described. The object detection system comprises a communications unit accessible by a user and an unmanned aircraft. The communications unit has a user interface, a storage medium, and a communication element. The unmanned aircraft includes a non-transitory computer readable medium configured to store information and executable programmed modules, a lift system, a sensor system, a processor, and an object detection module. The lift system includes one or more lift mechanisms configured to propel the aircraft. The sensor system is configured to sense information related to an environment of the aircraft and the store the sensed information in the non-transitory computer readable medium and/or transmit the sensed information to the communications unit. The processor is configured to control operation of the lift system and the sensor system, is communicatively coupled with the non-transitory computer readable medium and is configured to execute programmed modules stored therein. The object detection module is stored in the non-transitory computer readable medium and is executed by the processor. The object detection module obtains sensor information stored in the non-transitory computer readable medium by the sensor system and detects potential objects of interest within the environment of the aircraft based on an analysis of the sensor information. The object detection module may be additionally configured to communicate the detected potential objects of interest to the communications unit.

The object detection system may include additional features. For example, the object detection module may be further configured to determine a physical location of the potential object of interest based on an analysis of the sensor information, the physical location being coordinate location and/or depth within a body of water. The object detection module may be further configured to identify the detected potential object of interest based upon location and/or physical attributes (e.g. size, shape, color, and the like). The communications unit may be located on a surface vehicle. The surface vehicle may be a boat afloat in a body of water and/or an unmanned surface vehicle. The object or feature of interest may comprise at least one of fish, fish indicators, and marine wildlife. The user interface may be configured to display the detected potential objects of interest to a user. The user interface may be further configured to receive user input in response to the displayed potential object of interest. The user input may be communicated to the unmanned aircraft via the communication element.

According to another broad aspect of the disclosure, a non-transitory computer readable medium having stored thereon one or more sequences of instructions for causing one or more processors to perform steps, is described. The steps include (a) navigating an unmanned aircraft in the vicinity of a specific geographic location, the unmanned aircraft having a lift system comprising one or more lift mechanisms and a sensor system configured to sense information related to the environment of the specific geographic location; (b) detecting at least one of an object and feature of interest within the environment of the specific geographic location; and (c) communicating at least one of the sensed information and the at least one detected object and feature of interest to a user.

The user may be located within a mobile surface vehicle. The mobile surface vehicle may comprise a water vessel. The object or feature of interest may comprise fish, fish indicators, and/or marine wildlife. The processor(s) may perform the further step of: (d) determining the physical location of the object or feature of interest, the physical location being coordinate location and/or depth within a body of water. The processor(s) may perform the further step of: (e) identifying the detected object or feature of interest.

DETAILED DESCRIPTION

For as long as mankind has been going to sea in boats, we have been attempting to extend our visible range—to see farther, in order to gain more information about the world around us. This is especially true in fishing operations, where elevated lookouts, spotting planes, RADAR, and other advanced electronics are used in an attempt to locate fish or fish indicators beyond visual range. The use of an unmanned aircraft-based object detection system such as the one shown and described by way of example in the present disclosure can extend the visible range of fishing operators even further than previously possible, ultimately enabling detection of fish at greater ranges than with previous methods. As noted previously, improving the efficiency by which fish are located can lead to exponential overall efficiency gains for fishing operators. A primary driver of operating costs for fishing operators is the cost of fuel, and a significant portion of the fuel used in fishing operations is consumed while attempting to locate fish.

Figure 1:
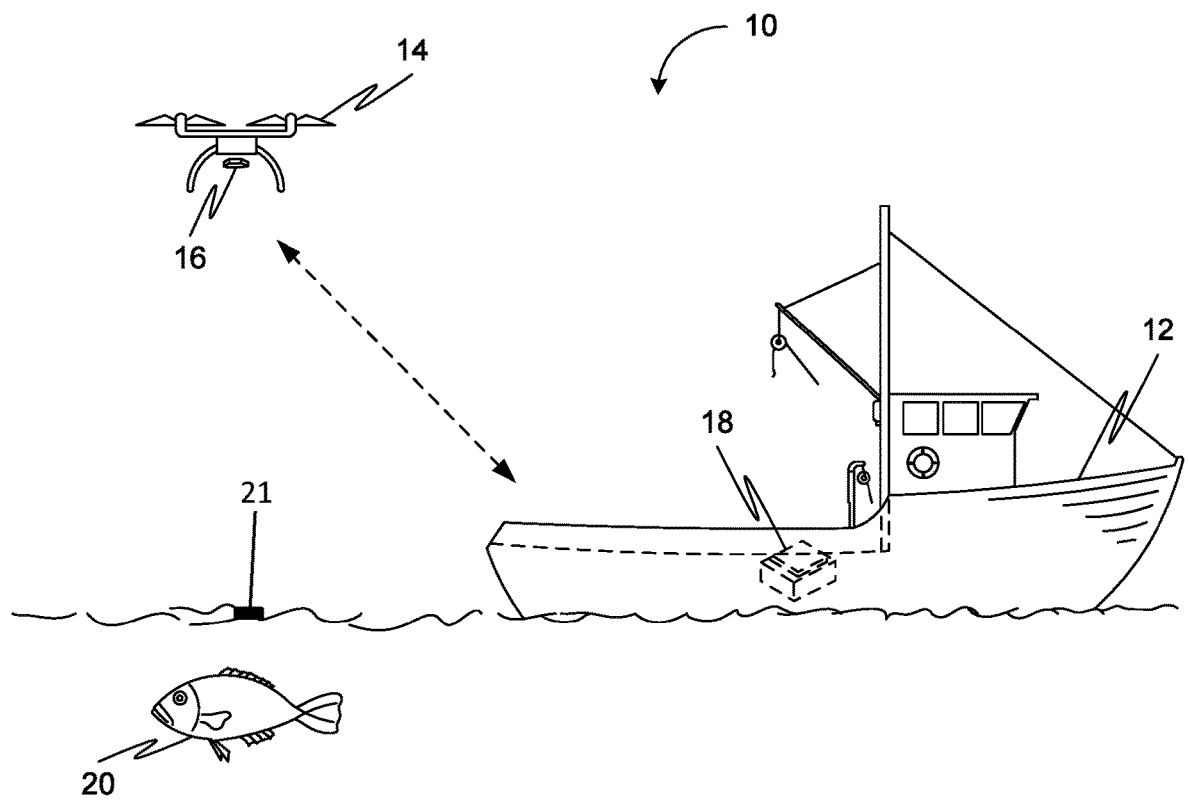
FIG. 1 is a schematic diagram illustrating an unmanned aircraft-based object detection system in use in the detection of fish according one example of the disclosure.

FIG. 1 illustrates one example of an unmanned aircraft-based object detection system ("UA system") 10 according to the present disclosure. In general, the UA system 10 includes a vessel 12, unmanned aircraft 14, unmanned aircraft payload ("UA payload") 16, and a communications station 18. The vessel 12 may be any vessel that transports one or more users having a need or desire to know the locations of certain types of objects 20 (e.g. fish) at sea, including but not limited to commercial and recreational fishing vessels, marine research vessels, and sightseeing vessels. Alternatively, the vessel 12 may be an unmanned vessel, for example a remotely controlled unmanned fishing or marine research vessel. The unmanned aircraft 14 is described for purposes of illustration in the present disclosure as a quad-rotor UAV, but any UAV capable of lifting aloft the payload 16 is a suitable aircraft platform within the system 10. The payload 16 is comprised of a combination of sensors and communications components for gathering data, optionally analyzing the data, and communicating the data (raw or analyzed) to the user. The payload 16 may be mounted as a module onto the aircraft 14 or alternatively may be integrated into the aircraft 14. The payload 16 communicates with the communications station 18 to enable performance of the method described below. The communications station 18 may be located onboard the vessel 12, onboard a different vessel (e.g. vessel 12' in FIG. 5), onboard a different unmanned aircraft (e.g. UA 14' in FIG. 5), or alternatively may be with a user on land. As will be appreciated, other related components can also be used and may be based on some of the same concepts detailed below. Moreover, a given implementation may have more or less of these components.

In the example described herein throughout, the crew of the vessel 12 is dedicated to locating fish or marine mammals, whether for catching and keeping as in fishing operations (recreational and/or commercial), or to simply observe and record data as in research or whale-watching operations. In any event, the vessel 12 is positioned within a body of water in relatively close proximity to the target objects 20 in order to detect them by any means. To date, the process of navigating to a particular point in the ocean with a high likelihood of finding fish has involved use of a vast array of methods and technologies. By way of illustration, these methods and technologies may include historical bathymetry charts, satellite imagery, or by locating indicia of fish activity, such as the presence of birds, kelp, or surface disturbances. The UA system 10 described in the current disclosure serves as an enhancement to all of these existing technologies and methods.

Figure 2:
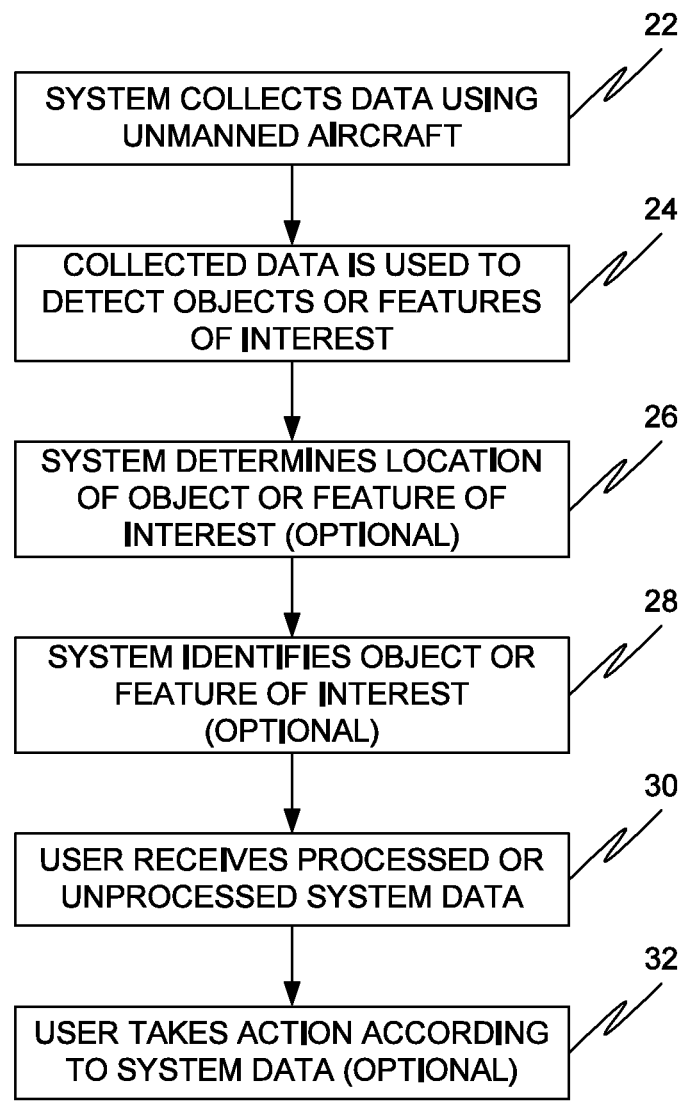
FIG. 2 is a flow chart depicting an example method for detecting, locating, and identifying fish or other objects using the unmanned aircraft-based object detection system of FIG. 1.

FIG. 2 is a flow chart depicting an example method of using the UA system 10 of the present disclosure to collect data, analyze the collected data, and act in response to the data analysis. The various steps are not necessarily in order, and in some instances may be performed in alternate orders. Additionally, some steps of the method presented in the flowchart are optional, and may be omitted without detrimentally affecting the remaining steps. The first step 22 is that the UA system 10 collects data using the unmanned aircraft 14, typically while the unmanned aircraft 14 is flying above the water or the vessel 12. The collected data may be any data that is useful in determining the type and location of various seaborne objects 20, including but not limited to optical and/or infrared imagery of the water surface and/or objects above, on, or beneath the surface of the water.

The next step 24 of the example method is that the collected data is used to detect objects or features of interest. Object detection may be user-driven or automated by the system. For user-driven object detection, the object or feature is detected by a user viewing the data collected by the system. For automated object detection, a computer detects the object or feature using the data collected by the system. The computer uses algorithms and software to detect such objects and features. By way of example, the computer performing this analysis may be located in the payload 16 on the unmanned aircraft 14 or alternatively may be located in the communications station 18 on the vessel 12.

Optional steps are also included in the flow chart. A first optional step 26 is the determination of the location of the object or feature of interest 20. This could include null results where no object or feature of interest 20 was detected. The location can be the absolute location (for example, latitude and longitude) and/or location relative to the vessel 12 or another object (for example, distance and direction). In the fishing example, the ability to determine the location of objects or features of interest 20 is invaluable, especially if the object or features of interest 20 are actually fish. The location of other objects or features of interest 20 such as fish indicators (e.g. certain plant life, floating debris, geologic formations above and/or below the surface, etc.) are also important because they provide known or typical areas where fish congregate.

A second optional step 28 is the identification of the object or feature of interest 20. The identification can be done by either a user of the data or by a computer. The identification can include any sort of categorization ranging from broad to specific. For example, in some instances an object may be broadly identified as "plant life." In other instances, it may be advantageous for the same object to be more narrowly identified as "kelp." It still other instances it may be desirable for the same object to be identified even more specifically as "*Macrocystis pyrifera*" (giant kelp). In yet another instance, the same object may be identified simply by its color or shape. In yet another instance, the same object may be identified as "non-water." Any number of categories may be used for identification of objects or features of interest.

In one embodiment, the computer identification may be accomplished via recognition of preprogrammed potential objects of interest. In another embodiment, the detection and identification of an object of interest 20 is accomplished by way of machine learning (not shown). Also referred to as artificial intelligence ("AI", the system can refine and enhance its object detection capabilities as it collects and processes more and more data, with or without user feedback. Such machine learning can apply to a specific trip, to specific environmental conditions (for example, lighting conditions or sea state), a specific geographic area, or in other specific usage scenarios. Alternatively, the machine learning may apply to the object detection and identification in general. As the UA system 10 learns, it can detect and identify objects of interest 20 more efficiently with higher probabilities of accurate detections and a reduction in the number of false detections. Furthermore, the machine learning process may improve the search process by way of altering the flight 34. For purposes of illustration only, a user may be shown many images which may or may not include images of marine mammals 42. The user then confirms which images contain marine mammals 42, and the UA system 10 learns which features and attributes are the most likely to result images that contain marine mammals 42. Over time, the system will become better at positively detecting and identifying marine mammals 42 in images.

The next step 30 on the flow chart is where the user receives processed or unprocessed system data. This could include the raw data, formatted data, compressed data, packaged data, or the data in any other form. This data can include the detection, location, identification of objects or features of objects of interest. The user may receive small pieces of data or large collections of data. The data may be categorized or uncategorized. Furthermore, it maybe be stored data.

The final step 32 is the user takes action based on the received data. This could include directing the vessel 12 (or a different vessel) to a new location, setting fish-catching devices, utilizing other technology, rerouting the umanned aircraft 14, notifying other vessels, saving the data, transmitting the data, or any other action based on the received data. Furthermore, the user's action may be to continue operations unchanged (i.e. decline to undertake new action in response to the received data).

Figure 3:
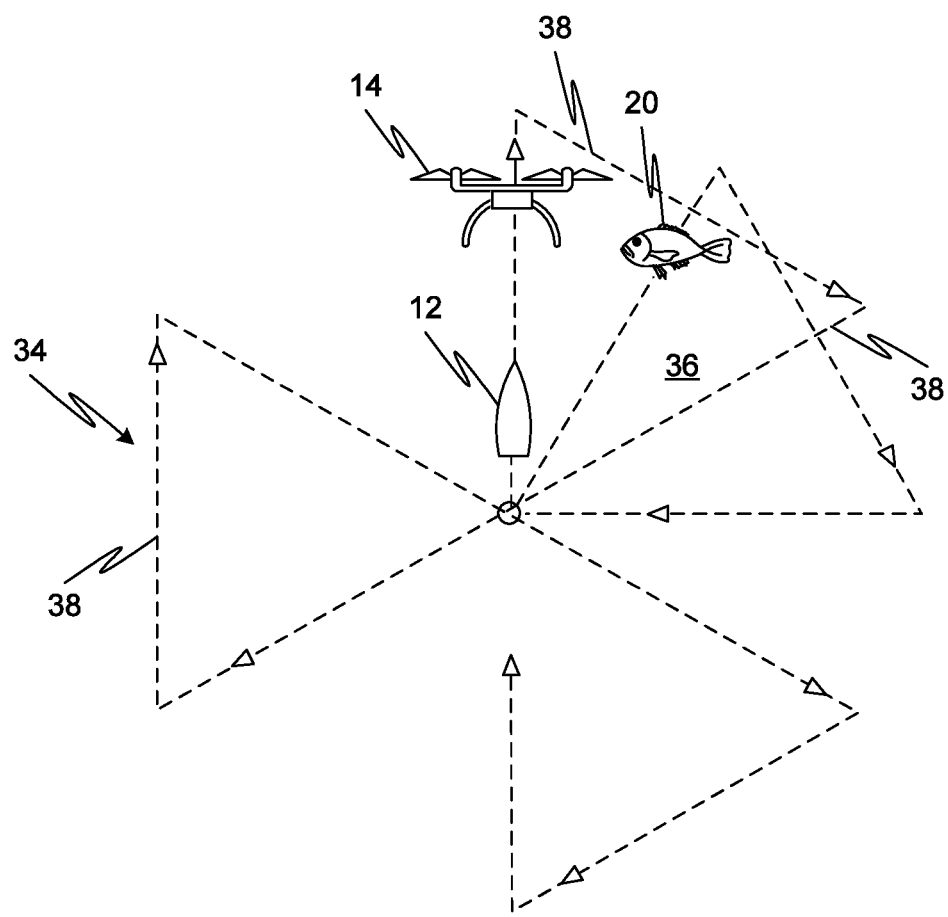
FIG. 3 is a plan view of one example of a search methodology performed by the unmanned aircraft-based object detection system of FIG. 1.

FIG. 3 depicts an example flight pattern 34 that the unmanned aircraft 14 may take to collect data and detect objects or features of interest 20 that are in, on, or above the water. The flight pattern 34 allows the unmanned aircraft 14 to alert the vessel 12 of objects or features of interest 20 in the water 36. The flight pattern 34 may vary based on a number of factors, including current state of the vessel 12, current state of the unmanned aircraft 14, user inputs, previous data collected by the unmanned aircraft 14, current data collected by the unmanned aircraft 14, environmental conditions, previous data from other sources, current data from other sources, types of objects of features of interest, the type of vessel 12, or other factors. The flight pattern 34 shown by way of example only in FIG. 3 includes a series of vectors 38 that direct the unmanned aircraft 14 to gather data from a series of generally triangular areas of seawater dispersed about the vessel 12. Other flight patterns are possible. For example, in some instances the unmanned aircraft 14 will orbit the vessel 12 at a predetermined distance, and will maintain that orbit as the vessel 12 moves through the water. In other instances, the unmanned aircraft 14 may circle the vessel 12 in a gradually increasing radial manner. In still other instances, the unmanned aircraft 14 may go directly to a location to inspect an object or feature of interest 20. In yet other instances, the unmanned aircraft 14 may hover a fixed location, such as above the vessel 12. Furthermore, it should be noted that the flight pattern 34 may change multiple times during a flight as necessary.

Figure 4:
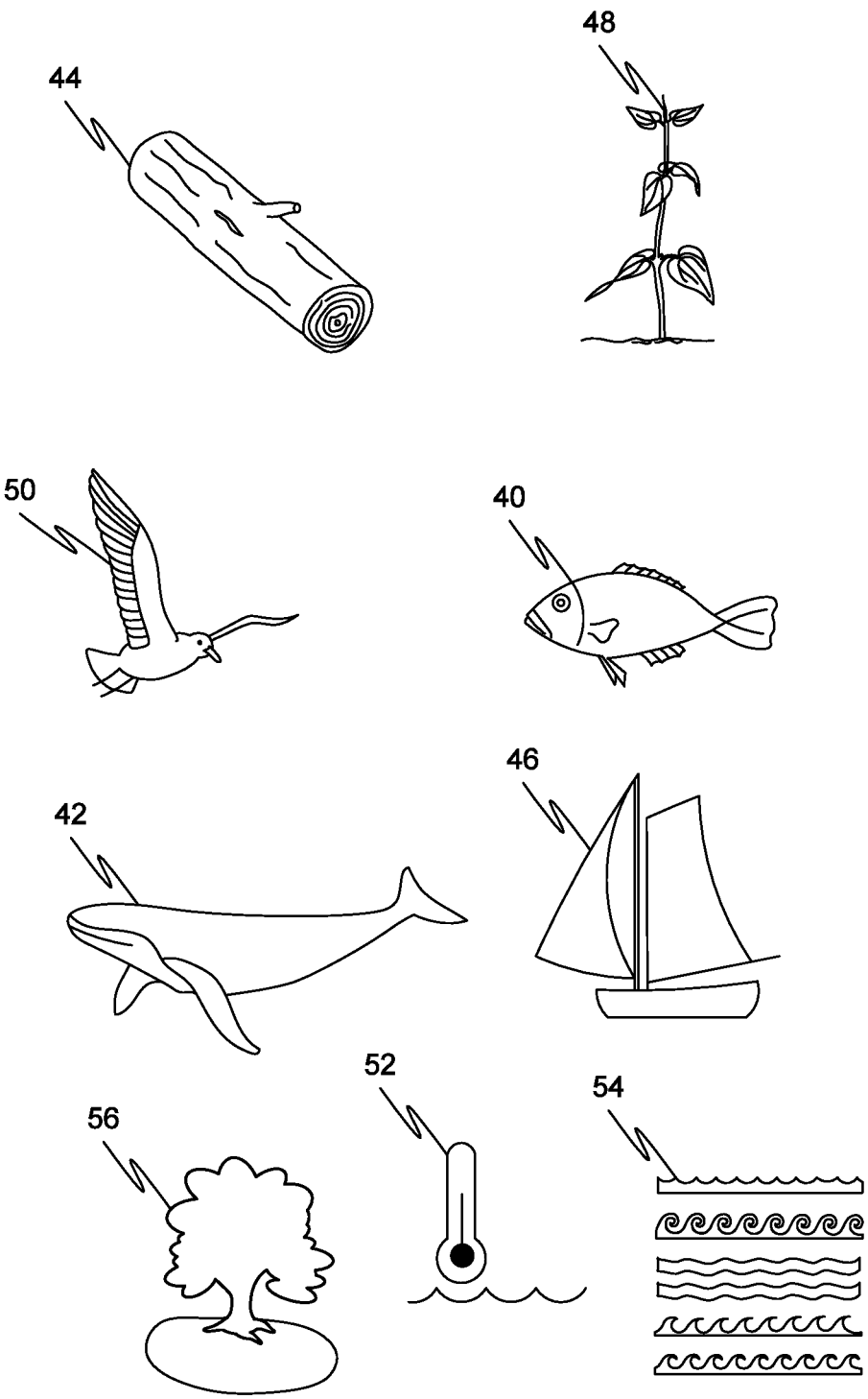
FIG. 4 is chart illustrating several examples of potential objects of interest of a search performed by the unmanned aircraft-based object detection system of FIG. 1.

FIG. 4 depicts several specific examples of potential objects or features of interest 20 in the fishing example described herein. The specific examples shown in FIG. 4 are for illustration purposes only, and does not represent a comprehensive or exhaustive group. Any objects or features 20 that inform the user (or system 10) about the potential to find fish or other sea life will be considered and analyzed. The most obvious object or feature of interest to a fisherman is one or more fish 40, which may include targeted fish, bait fish, or other fish. Other objects include marine mammals 42 such as whales, seals, or sea lions. Floating objects 44, such as logs, trash, fish aggregating devices, flotsam, jetsam, buoys, debris, or markers can inform a user on a vessel. Other vessels 46, including boats, rafts, and ships, can be used to inform a user. Marine plant life 48, including but not limited to kelp, seaweed, plankton, and other plant life, is an important indicator the presence of fish or other sea life. One or more birds 50 may be on or above the water and may be an object of interest. Water temperature 52 is a valuable feature as well, as is water color or texture 54. The location of reefs, sandbars, islands or other land features 56 may also be used.

In one embodiment, the aircraft 14 may deploy a marker or buoy 21 (see FIG. 1) on or near an object of interest 20. This marker 21 may be a floating object that is enabled with GPS so that it can determine its location and transmit that location to any number of suitable receivers, such as (but not necessarily limited to) the UA system that deployed the GPS-enabled floating object, another UA system, manned aircraft (e.g. patrol, commercial, military) and/or land-based stations. Alternatively, the marker 21 may be a physical marker, such as a dye, that aids in localization by the user by optical means. A given unmanned aircraft 14 may have multiple markers 21 that could be deployed at multiple locations. These markers 21 could also serve to aid the user in locating detected objects of interest 20 in the event that the aircraft 14 has a communication problem that prevents the anticipated transmission of data.

Figure 5:
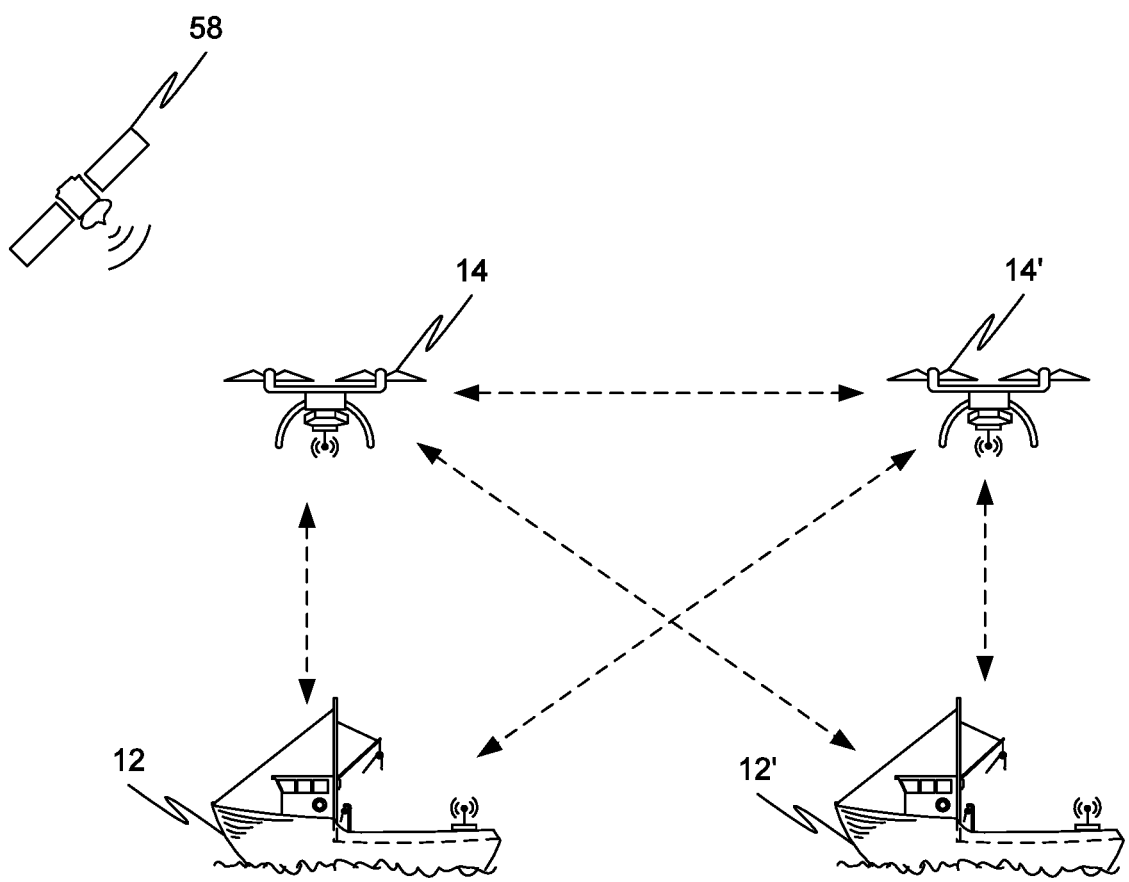
FIG. 5 is a schematic diagram illustrating an example of an unmanned aircraft-based object detection system of the present disclosure using multiple aircraft and multiple vessel operations.

FIG. 5 depicts a variant of the system that includes multiple UA systems (multiple unmanned aircrafts 14, 14' and/or multiple vessels 12, 12') working together to collect and/or process data in order to detect, locate, and/or identify objects or features of interest 20. Although shown and described herein as a pair of vessels 12, 12' and a pair of unmanned aircrafts 14 14', it should be noted that the ratio of vessels to aircrafts is not required to be 1:1, and the multiple vessels may be manned or unmanned in any combination. For example, a single manned vessel 12 may interact with multiple unmanned aircrafts 14 and/or multiple unmanned vessels 12. Furthermore, any number of UA systems may communicate freely with each other, providing opportunities for multi-segment communication paths to collect, share, and disseminate data collected by the unmanned aircrafts 14, 14'. This includes communications directly between various unmanned aircrafts 14, 14', between the unmanned aircrafts 14, 14' and (manned or unmanned) vessels 12, 12', directly between the various vessels 12, 12', between the vessels 12, 12' and/or the unmanned aircrafts 14 14' and a station on shore (not shown), or to a remote user via a satellite communication link 58. Thus, multiple UA systems may be used to extend the transmission range (and therefore the search radius) such that data is passed from one aircraft 14 or vessel 12 to the next until it reaches its final destination, as in a communication relay. Furthermore, it may be used to deliver data to multiple locations. For example, data may be transmitted to multiple users in different locations (e.g. different vessels, shore station, or remote user) or a single user may send commands to multiple unmanned aircraft 14 and/or multiple manned or unmanned vessels 12.

Figure 6:
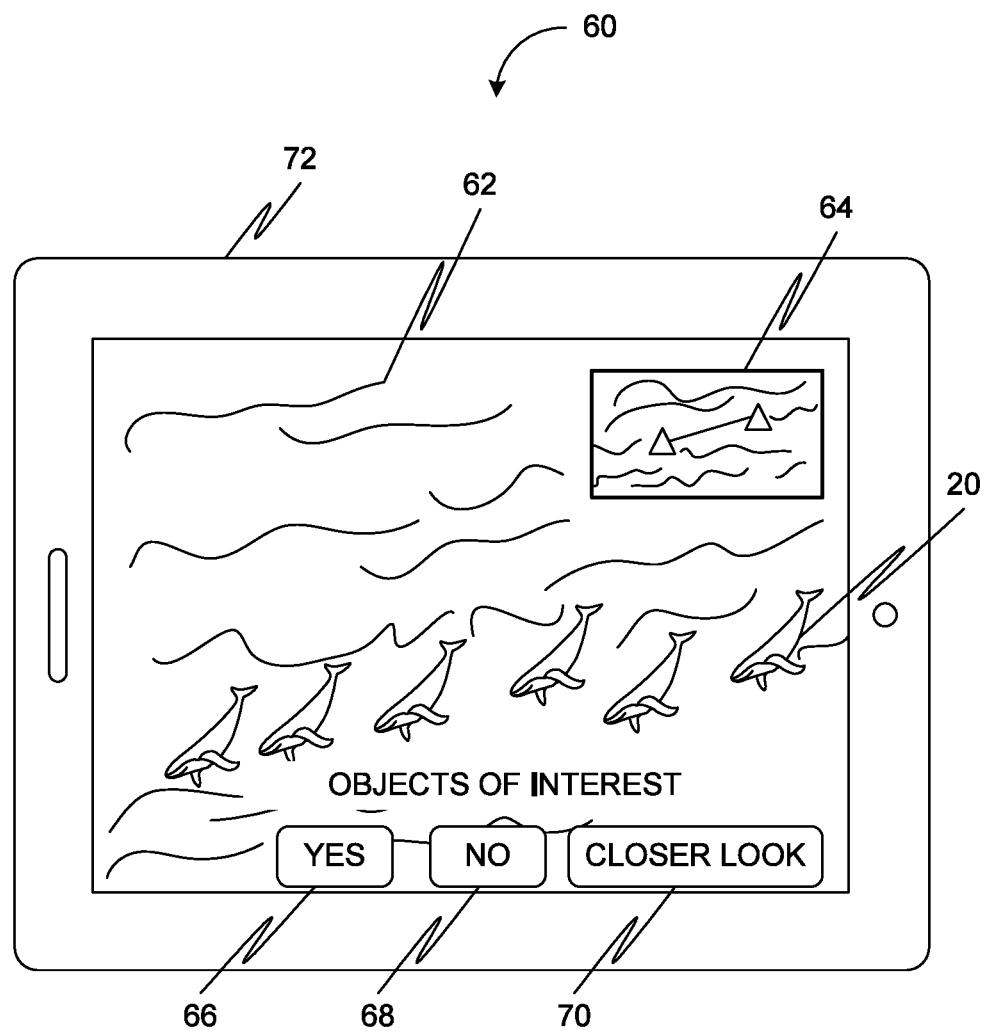
FIG. 6 is a plan view of an example of a user interface forming part of the unmanned aircraft-based object detection system of FIG. 1.

FIG. 6 depicts an example of a user interface 60 forming part of the UA system 10. The user interface 60 ensures that the user, regardless of their location, can interface with the UA system 10. The user interface 60 can be used to display data, receive user inputs, provide guidance and navigation information, provide health and status information, tracking, and control. The user interface 60 may perform data processing tasks. The user interface 60 may provide alerts and notifications to the user—including, but not limited to, notification of detection of objects of interest 20. In the instant example shown in FIG. 6, the user interface 60 includes a primary window 62 which for example may show (among other things) a live video feed from a camera in the payload 16 on the unmanned aircraft 14. Another window 64 may show the relative positioning of the vessel 12 and unmanned aircraft 14 on a digital map of the body of water, for example using GPS technology. The user may be prompted to provide real time feedback to the UA system 10 as to whether the detected objects are in fact objects of interest 20, for example by selecting a "Yes" icon 66 to give an affirmative response, a "No" icon 68 to give a negative response, or a "Closer Look" icon 70 to inform the UA system 10 that more information is needed. If the user selects the "Yes" icon 66, then the user interface 60 may display a map of the area displaying the exact location of the objects of interest. This location may be determined (by way of example) using the aircraft's GPS location and camera telemetry. Thus, once an object of interest is found, the boat operator will be able to direct the vessel to the exact location provided by the UA system 10. The user interface 60 is shown as being displayed on a tablet computer 72, however the user interface 60 could additionally be provided on a desktop computer, laptop computer, and/or mobile device including smartphones.

Figure 7:
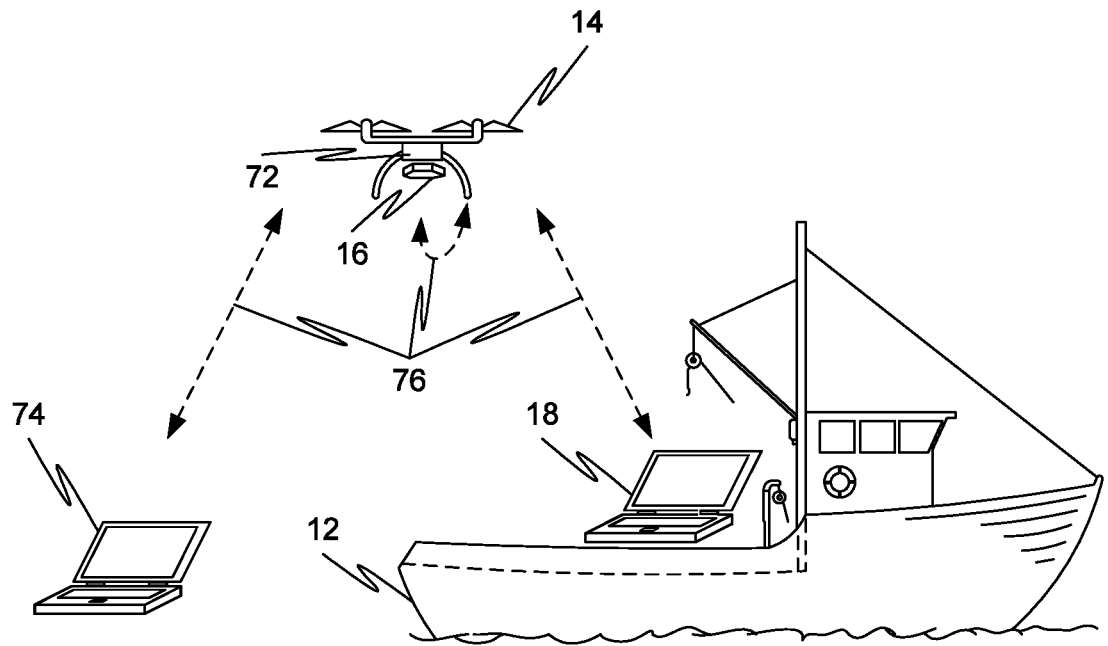
FIG. 7 is a schematic diagram illustrating an example of potential data flow and data processing locations within the unmanned aircraft-based object detection system of FIG. 1.

FIG. 7 illustrates an example of the data processing and communication components of the UA system 10. In a preferred embodiment, the unmanned aircraft 14 includes an onboard computer 72, which may be included in the payload 16 or may be located elsewhere on the unmanned aircraft 14. The vessel 12 includes a computer system referred to as the communications station 18. Additional computer systems (e.g. desktop computers, laptop computers, tablet computers, smartphones, and the like) may access the data from remote locations and are referred to as "remote computers" 74. Data collected by the unmanned aircraft 14 may be transmitted 76 to the communications station 18 for processing and/or handling. Data collected by the unmanned aircraft 14 may be transmitted 76 to the onboard computer 72 for processing and/or handling. Data collected by the unmanned aircraft 14 may be transmitted 76 to a remote computer 74 for processing and/or handling. One or more of these data paths may be used at any time and are not necessarily exclusive of one another. Data maybe be transmitted 76 via electrical, optical, radio frequency, infrared, or acoustic means. Data processing may occur in multiple locations or at different times. Using the UA system 10 to collect, process, and/or analyze data will allow fishermen to make better decisions about where, when, and how to fish. The UA system 10 as described in the present disclosure will reduce uncertainty and enable more consistent catches.

Figure 8:
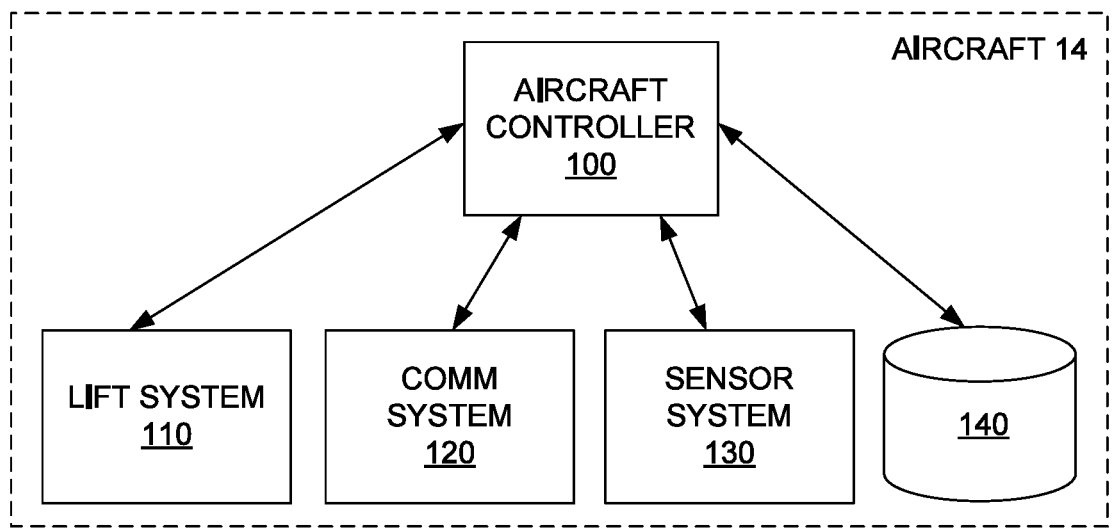
FIG. 8 is a block diagram illustrating various components of an unmanned aircraft forming part of the unmanned aircraft-based object detection system of FIG. 1.

FIG. 8 is a block diagram illustrating an example unmanned aircraft 14 according to an embodiment of the invention. In the illustrated embodiment, the aircraft 14 comprises an aircraft controller 100, a lift system 110, a communication system 120, a sensor system 130 and a data storage area 140.

The aircraft controller 100 is part of the onboard computer 72 (FIG. 7) and is a processor device that is configured to execute instructions to control operation of the aircraft 14. The instructions may be dynamically received, stored in the data storage area 140 or they may be integral to the controller 100. In operation, the controller 100 is configured to control operation of the lift system 110 for flight, control operation of the communication system 120 for wired or wireless communication between the aircraft and other devices, control operation of the sensor system 130 to receive information about the environment of the aircraft 14 (including potential objects or features of interest) and control operation of the data storage area 140 to access information stored therein and to store information therein.

The lift system 110 is configured to provide the aircraft 14 with the ability to fly by generating lift and propelling the aircraft 14 through three-dimensional space. The lift system 110 is configured to move the aircraft 14 through three dimensional space, for example up, down and side-to-side, which in combination allow the aircraft 14 to move through three dimensional space. The lift system 110 is also configured to rotate the aircraft 14 so the aircraft 14 is capable of flight in all directions. The lift system 110 is also configured to hover the aircraft 14 and maintain a fixed position in three-dimensional space. In one embodiment, the lift system 110 generates lift by passing air over an airfoil. By generating sufficient lift, the aircraft 14 can ascend. By reducing the lift, the aircraft 14 can descend. The lift system 110 is also configured to communicate with the controller 100 to allow the controller 100 to fly the aircraft 14.

The aircraft communication system 120 is configured to allow wired and wireless communication between the aircraft 14 and other devices, including but not limited to the communications station 18. In one embodiment, the aircraft communication system 120 includes one or more antennas, transmitters, receivers, and other equipment necessary for the aircraft 14 to communicate with other devices. For example, during flight, the aircraft 14 can communicate with other devices wirelessly and when not in flight, the communication system 120 may include a physical connection port to allow the communication system 120 to communicate over a wired connection. Advantageously, the communication system 120 is also configured to communicate with the controller 100 to allow the controller 100 to transmit and receive data to and from outside of the aircraft 14.

The sensor system 130 is configured to sense information related to the environment of the aircraft 14. In one embodiment, the sensor system 130 comprises one or more sensors positioned at any location within or on the aircraft 14. For example, the sensors may include one or more of each of optical and infrared cameras, range-finders, inertial measurement units (IMUs), accelerometers, magnetometers, compasses, and acoustic sensors (e.g. ultrasound), just to name a few. Advantageously, the individual sensors may be co-located or dispersed around the aircraft 14, or be deployed into the air or water. The individual sensors advantageously sense information and may directly store the information as data in the data storage area 140. Additionally, the sensor system 130 is configured to communicate with the controller 100 to allow the controller 100 to operate individual sensors and receive and process sensed information and store the sensed information as data in the data storage area 140. The sensor system 130 is also configured to allow the addition of new sensors and the removal of existing sensors. For example, the sensor system 130 may allow an optical camera to be swapped out for an infrared camera to satisfy the characteristics and/or requirements of the next mission.

Figure 9:
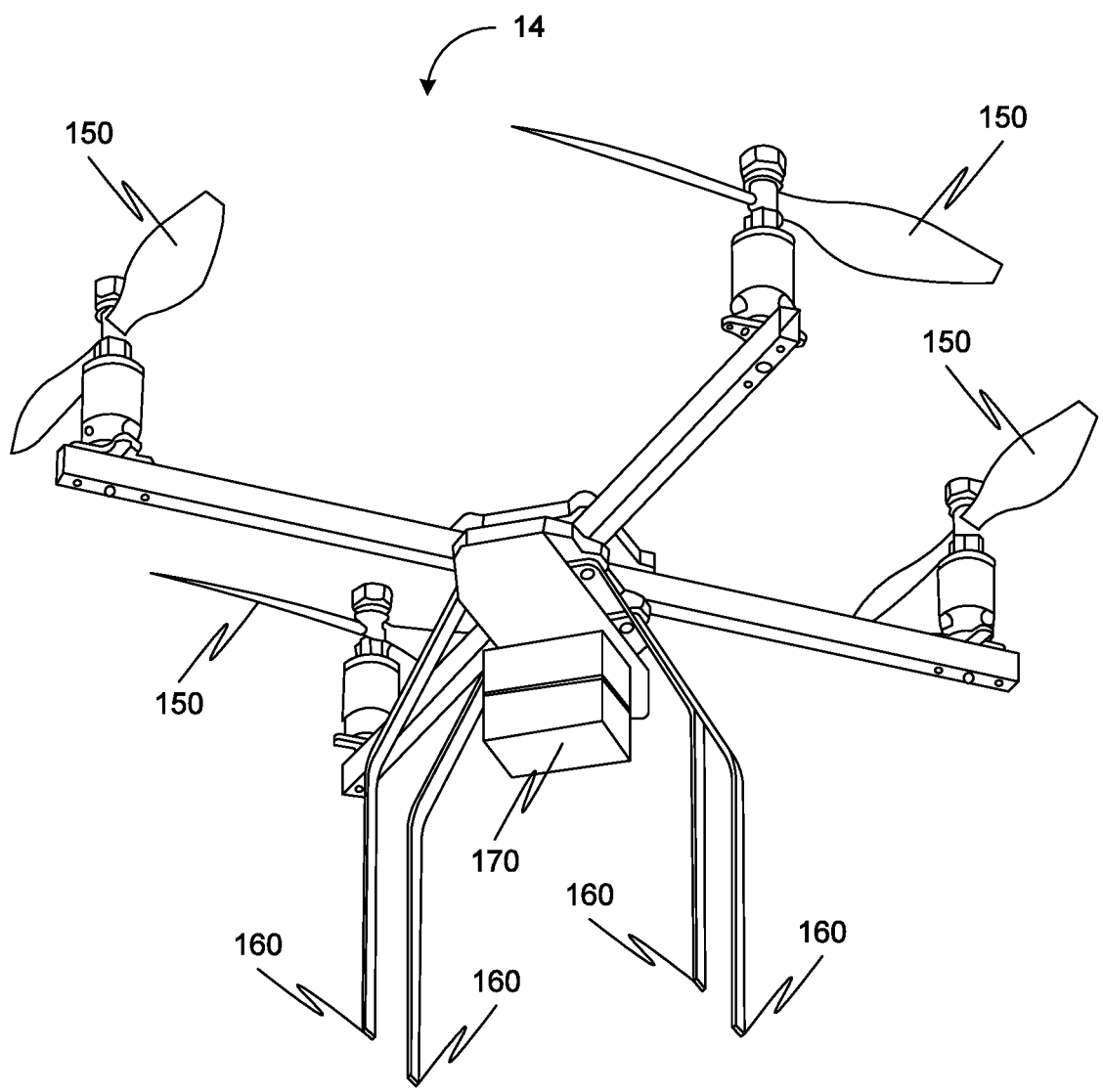
FIG. 9 is a perspective view of an example of the unmanned aircraft of FIG. 8.

FIG. 9 is a block diagram illustrating an example unmanned aircraft 14 according to an embodiment of the invention. In the illustrated embodiment, the aircraft 14 comprises a plurality of lift mechanisms 150. The plurality of lift mechanisms 150 are part of the lift system 110 previously described with respect to FIG. 8. In the illustrated embodiment, the aircraft 14 also comprises a plurality of landing feet 160. The plurality of landing feet 160 are part of the chassis and/or housing of the body of the aircraft 20. In the illustrated embodiment, the aircraft 14 also comprises a sensor unit 170. The sensor unit 170 is coupled to the chassis and/or housing of the body of the aircraft 14 and comprises one or more sensors.

Figure 10:
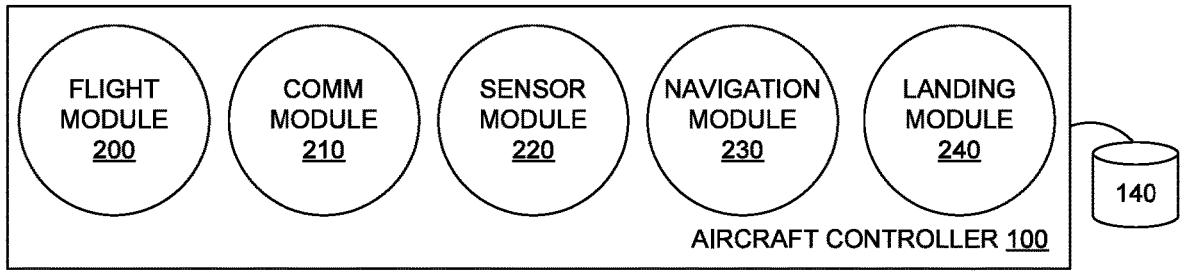
FIG. 10 is a block diagram illustrating an example controller forming part of the unmanned aircraft of FIG. 8.

FIG. 10 is a block diagram illustrating an example controller 100 in an unmanned aircraft according to an embodiment of the invention. In the illustrated embodiment, the controller 100 comprises a flight module 200, a communication module 210, a sensor module 220, a navigation module 230 and a landing module 240. As previously described, the controller 100 is configured to store data in and obtain data from the data storage area 140. In various embodiments, the illustrated modules 200-240 can be implemented entirely in software or may be implemented entirely in hardware or may be implemented in a combination of hardware and software.

The flight module 200 is configured to fly the aircraft 20. The flight module 200 is configured to perform all processes, perform all calculations, and execute all algorithms to ensure reliable flight of the aircraft 20. The flight module 20 may also be referred to herein as a flight controller, autopilot, or inner-loop control. The flight module 20 is configured to translate inputs from the aircraft controller 100 to the appropriate outputs to the previously described lift system 110. For example, if the aircraft 20 needs to descend at a steady rate, the flight module 200 determines how much to adjust the power being delivered to each lift mechanism 150 in order to execute that descent.

The communication module 210 is configured to control and operate the various components of the communication system 120. The communication module 210 is configured to send data to the communication system 120 and is also configured to receive data from the communication system 120 and store data in the data storage area 140. The communication module 210 is also configured to process the received data directly or route the received data to an alternative module for processing or storing in the data storage area 140. The communication module 210 is also configured to manipulate and package data, commands, and telemetry information so that such data, commands, and information is suitable to be transmitted or received or routed to another module.

The sensor module 220 is configured to operate the sensor system 130. In one embodiment, the sensor module 220 is configured to receive data generated from information sensed by the individual sensors of the sensor system 130. Additionally, the sensor module 220 is configured to process the received data, manipulate the data, reformat the data, perform calculations using the data, and store the data and/or results of calculations on the data in the data storage area 140. The sensor module 220 is also configured to make the data available to other modules and systems as necessary, for example via the data storage area 140 or directly via data transfer from the sensor module 220 to the recipient module. The sensor module 220 is also configured to control the operation of the sensors, including adjusting the state of an individual sensor, for example by turning an individual sensor on or off, or by changing the function or mode of an individual sensor. For example, the sensor module 220 may turn on a camera, receive image frames from the camera, time stamp those image frames, and store the image frames in data storage area 140 (e g., so that the image frames can be used by the navigation module 230 and/or the landing module 240), and then instruct the camera to go into standby mode.

One example of data manipulating and processing that may be performed by the sensor module 220 involves bird detection. As noted above, birds are one example of a specific object or feature of interest that is not actual fish but could help fishermen locate a school of fish. The example bird detection system provided on the UA system 10 processes data from an imaging sensor (e.g. color camera, infrared) pointed towards the horizon. Birds are detected by finding high contrast blobs against semi-homogenous backgrounds. A horizon-detector or other segmentation algorithm first decomposes the scene into regions of similar content (for example, a sky region and an ocean region). An anomaly detector classifies pixels within a region are then classified as foreground or background. Background pixel intensities are assumed to be semi-homogenous—this implies that for any given pixel there exists a nearby pixel with similar intensity. Foreground pixels, however, have relatively high differences with all nearby pixels.

Bird detection consists of two steps—an anomaly detection step and a clustering step. In anomaly detection, the intensity of a candidate pixel p is compared with the intensities of N neighbor pixels that are approximately equidistant from p. The sampled pixels are chosen to be near to p but not necessarily adjacent (8 pixels is typical). The neighbor offsets may be constrained to be integers for more efficient computation. The anomaly score is defined to be the minimum difference between all neighbor pixels and the candidate pixel. This metric is very small (often zero) for each background pixel due to the homogeneity requirement. This metric is relatively larger in foreground pixels. A threshold is applied to the anomaly score to determine a set of anomalous pixel locations to remove spurious detections. A location is anomalous if M pixels in a K×K neighborhood all have an anomaly score larger than a given threshold t (typical values: M=5, K=5, t=13).

A bird will often cause many anomalous pixels, and so the clustering step groups together nearby anomalous pixels to form individual detections. First, the set of points is reduced using the k-means clustering algorithm into a smaller set of anomalous points. Second, anomalous points are grouped such that every point within a group is within a small distance (e.g., 5 pixels) of another point in the group. The centroid of each cluster-group is reported as the detected bird location.

The example bird detection system described herein has several positive attributes. First, it is well suited for constrained hardware. All per-pixel processing requires few operations, and each operation is highly parallelizable, allowing vector processing capabilities to be effectively utilized. Second, it requires only a single image to detect anomalies. This is in contrast to most anomaly detection algorithms, which typically require multiple images and an effective camera motion compensation mechanism to build up a background model.

Additionally, because the approach is anomaly based and not dependent on the shape or appearance of the bird, it can detect a variety of birds with very few pixels on target.

Another example of data manipulating and processing that may be performed by the sensor module 220 involves kelp detection. Sea kelp attracts fish, birds, and marine wildlife. Scanning the sea surface for kelp is a technique used by fishermen to locate schools of fish. Unfortunately, kelp scanning is tedious, and inefficient when performed from a low vantage point (near the water's surface). The example kelp detection system on the UA system 10 uses an algorithm to enable the UA system 10 to automatically detect kelp on the sea surface, and alert the user with visual and geographical information. The sensor module 220 parses a live video stream into different color bands that are compared to known color bands for kelp. Kelp floating on or near the sea surface can be reliably detected and segmented using this technique. The example kelp detection system is more effective than a typical human observer because the aerial vantage point of the unmanned aircraft 14 makes kelp easier to see, and enables detection from greater distances. In addition, the algorithm uses the GPS location and camera state of the unmanned aircraft 14 to pinpoint the exact location of kelp paddies, so that the boat operator can transit the fishing vessel directly to those locations.

The navigation module 230 is configured to navigate the aircraft during flight. The navigate module 230 is also configured to navigate the aircraft to and from the mobile structure and mobile landing area. In one embodiment, the navigation module 230 is configured to determine the direction the aircraft should move in three dimensional space and when the aircraft should move and how the aircraft should move. Advantageously, the navigation module 230 is configured to use predetermined coordinates and GNSS information. However, the navigation module 230 may also use other means of navigation as will be understood by those skilled in the art. At the end of a mission and prior to landing, the navigation module 230 is configured to navigate the aircraft to intercept the mobile structure. In one embodiment, the navigation module is configured to cooperate with the flight module 200 to cause the aircraft to fly in the desired direction and fly to the desired location, for example when the aircraft is returning to the mobile structure at the end of a mission.

The landing module 240 is configured to execute a landing maneuver and bring the aircraft into contact with a surface of a landing area. The landing module 240 is configured to control and execute the landing maneuver in cooperation with the flight module 200. In one embodiment, the landing module 240 is configured to obtain data from data storage area 140 or to receive sensed information directly from the sensor system 130 or from the sensor module 220 and process the data, run algorithms on the data, perform calculations on the data and control and operate the lift system 110 in order to cause the aircraft to move in such a way that it lands at the landing area at a predetermined time. For example, in one embodiment, the landing module 240 obtains image data (e.g., a single image file or plural image files) stored in the data storage area 140, performs image processing algorithms on the images to determine the location of the landing area relative to the aircraft and to determine how the aircraft needs to move in order to reach the landing area and cooperate with the flight module 200 to send instructions to the lift system to cause the aircraft to move in the desired direction and hover over the landing area.

Figure 11:
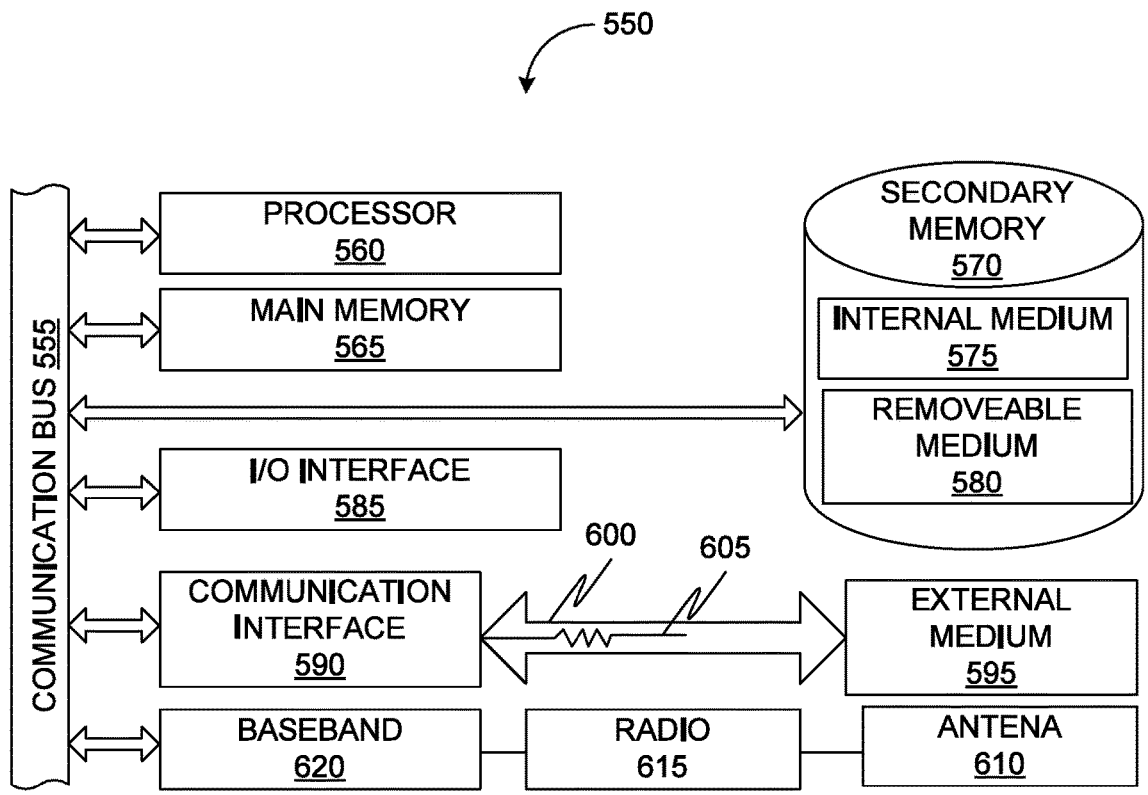
FIG. 11 is a block diagram illustrating an example wired or wireless processor enabled device that may be used in connection with various embodiments described herein.

FIG. 11 is a block diagram illustrating an example wired or wireless system 550 that may be used in connection with various embodiments described herein. For example the system 550 may be used as part of or in conjunction with an unmanned aircraft-based object detection system 10 as previously described with respect to FIGS. 1-10. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (eg., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, secure digital ("SD") card, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (eg., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("1C"). The demodulator and modulator can also be separate components. In the incoming path, the demodulator strips away the RF carrier signal leaving a baseband data signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

We claim:

1. An object detection system, comprising:
    a communications unit accessible by a user, the communications unit having a user interface, a storage medium, and a communication element; and
    an unmanned aircraft comprising:
        a non-transitory computer-readable medium configured to store information and executable programmed modules;
        a lift system comprising one or more lift mechanisms configured to propel the unmanned aircraft;
        a sensor system configured to obtain sensor information related to an environment of the unmanned aircraft and at least one of store the sensor information in the non-transitory computer-readable medium and transmit the sensor information to the communications unit;
        a processor configured to control operation of the lift system and the sensor system, the processor communicatively coupled with the non-transitory computer-readable medium and configured to execute programmed modules stored therein; and
        an object detection module stored in the non-transitory computer-readable medium and configured to be executed by the processor, the object detection module configured to obtain sensor information stored in the non-transitory computer-readable medium by the sensor system, detect an object of interest comprising at least one of fish, fish indicators, and marine wildlife within the environment of the unmanned aircraft based on an analysis of the sensor information, and communicate the detected object of interest to the communications unit.

2. The objection detection system of claim 1, wherein the object detection module is further configured to determine a physical location of the detected object of interest based on an analysis of the sensor information.

3. The object detection system of claim 2, wherein the physical location comprises at least one of a coordinate location and a depth within a body of water.

4. The object detection system of claim 1, wherein the object detection module is further configured to identify the detected object of interest based on at least one of a location and physical attributes of the detected object of interest.

5. The object detection system of claim 4, wherein the physical attributes comprise at least one of a size, a shape, and a color of the detected object of interest.

6. The object detection system of claim 1, wherein the communications unit is located on a surface vehicle.

7. The object detection system of claim 6, wherein the surface vehicle is a boat afloat in a body of water.

8. The object detection system of claim 6, wherein the surface vehicle is an unmanned surface vehicle.

9. The object detection system of claim 1, wherein the user interface is configured to display at least one of the detected object of interest and a physical location of the detected object of interest to flail the user.

10. The object detection system of claim 9, wherein the user interface is further configured to receive user input from the user in response to the displayed at least one of the detected object of interest and the physical location of the detected object of interest.

11. The object detection system of claim 10, wherein the user input is communicated to the unmanned aircraft via the communication element.

12. The object detection system of claim 1, wherein the object of interest comprises fish or marine wildlife.

13. The object detection system of claim 12, wherein the object of interest comprises fish.

14. A non-transitory computer-readable medium having stored therein one or more instructions for causing one or more processors to perform at least:
    navigating an unmanned aircraft in a vicinity of a specific geographic location, the unmanned aircraft comprising a lift system comprising one or more lift mechanisms and a sensor system configured to obtain sensor information related to an environment of the specific geographic location;
    detecting an object of interest comprising at least one of fish, fish indicators, and marine wildlife within the environment of the specific geographic location based on an analysis of the sensor information; and
    communicating detected object of interest to a user.

15. The non-transitory computer-readable medium of claim 14, wherein the user is located within a mobile surface vehicle.

16. The non-transitory computer-readable medium of claim 15, wherein the mobile surface vehicle comprises a water vessel.

17. The transitory computer-readable medium of claim 14, wherein the one or more instructions cause the one or more processors to further:
    determine a physical location of the detected object of interest.

18. The non-transitory computer-readable medium of claim 17, wherein the physical location comprises at least one of a coordinate location and a depth within a body of water.

19. The non-transitory computer-readable medium of claim 14, wherein the one or more instructions cause the one or more processors to further:
    identify the detected one object of interest.

20. The non-transitory computer-readable medium of claim 14, wherein the object of interest comprises fish or marine wildlife.

21. The non-transitory computer-readable medium of claim 20, wherein the object of interest comprises fish.

* * * * *